United States Patent [19]
Hunt

[11] Patent Number: 4,470,476
[45] Date of Patent: Sep. 11, 1984

[54] HYBRID VEHICLES

[76] Inventor: Hugh S. Hunt, 12219 River Rd., Potomac, Md. 20854

[21] Appl. No.: 510,116

[22] Filed: Jul. 1, 1983

Related U.S. Application Data

[60] Division of Ser. No. 322,050, Nov. 16, 1981, Pat. No. 4,405,029, which is a continuation-in-part of Ser. No. 108,987, Jan. 2, 1980, abandoned.

[51] Int. Cl.³ ............................................. B60K 9/04
[52] U.S. Cl. ............................ 180/65.2; 60/718; 180/65.3; 320/61
[58] Field of Search ............... 180/65 R, 65 A, 65 B, 180/54 C; 74/661, 665 B, 665 C; 192/48.91; 310/306; 322/2 R; 320/61; 60/718

[56] References Cited

U.S. PATENT DOCUMENTS

| | | | |
|---|---|---|---|
| 1,118,269 | 11/1914 | Creveling | 320/61 X |
| 1,156,594 | 10/1915 | Fiscus | 180/65 R X |
| 1,284,664 | 11/1918 | Hamrick | 180/65 A |
| 2,717,523 | 9/1955 | Lammerz | 74/661 X |
| 3,424,286 | 1/1969 | Otterbach et al. | 192/48.91 X |
| 3,888,325 | 6/1975 | Reinbeck | 180/65 A |
| 3,923,115 | 12/1975 | Helling | 180/65 A |
| 3,979,913 | 9/1976 | Yates | 60/618 |
| 3,993,152 | 11/1976 | Fogelberg | 74/665 D X |
| 4,007,594 | 2/1977 | Elsea, Jr. | 60/618 |
| 4,038,558 | 7/1977 | Gallois | 290/52 |
| 4,087,974 | 5/1978 | Vaughn | 60/618 |
| 4,148,192 | 4/1979 | Cummings | 180/65 A X |

FOREIGN PATENT DOCUMENTS 2345018 4/1974 Fed. Rep. of Germany ... 180/65 A

*Primary Examiner*—Joseph F. Peters, Jr.
*Assistant Examiner*—Michael Mar
*Attorney, Agent, or Firm*—Dowell & Dowell

[57] ABSTRACT

Hybrid vehicles having two or more power plants which can be operated independently or simultaneously and includes an electric motor as well as an internal combustion engine which may be selectively connected to drive the drive wheels of such vehicles either independently or simultaneously. When the internal combustion engine is used to drive a vehicle, the waste heat from such engine is utilized as a source of energy to generate electricity which electricity may be stored in suitable storage batteries and thereafter such batteries may be used to drive an electric motor.

3 Claims, 7 Drawing Figures

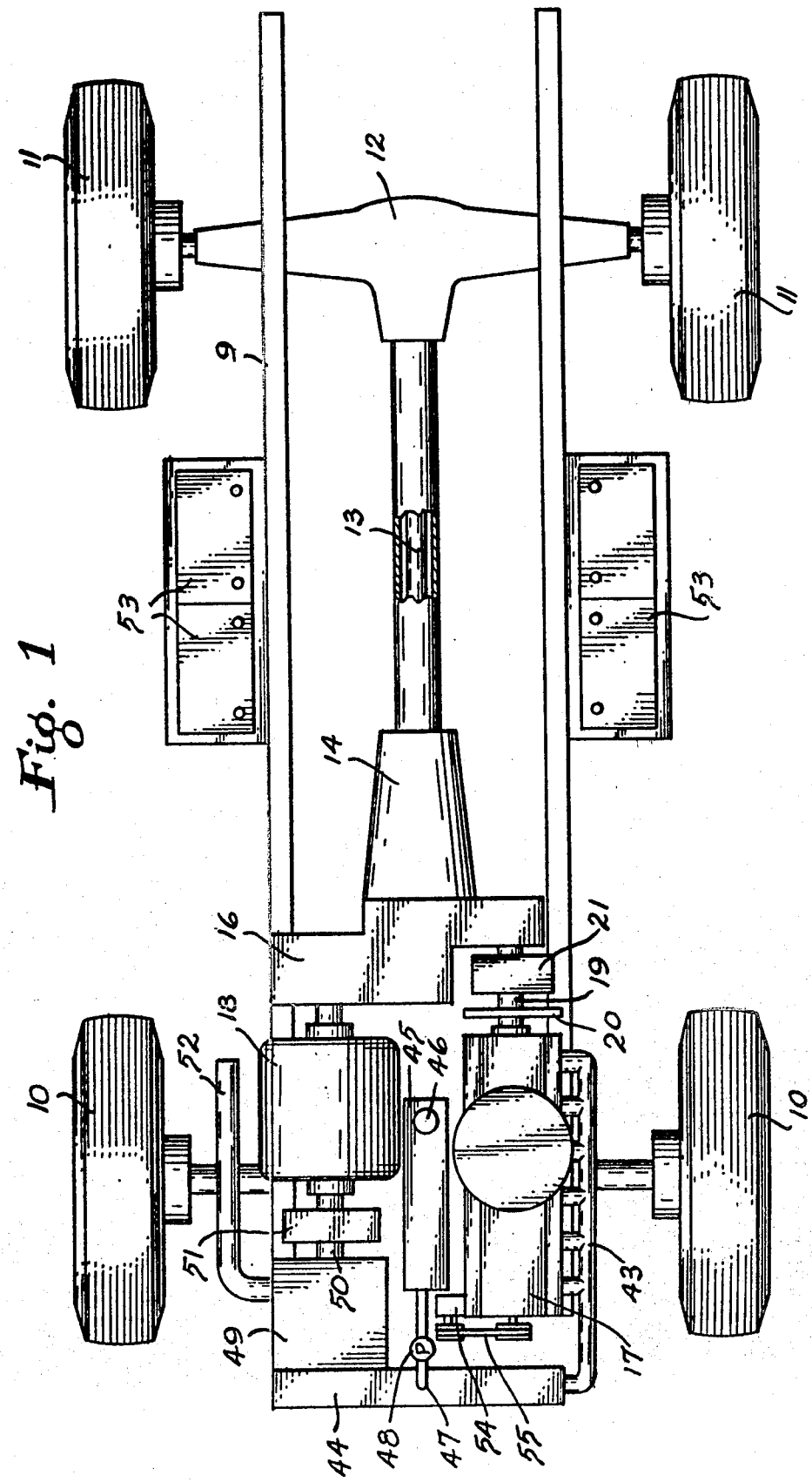

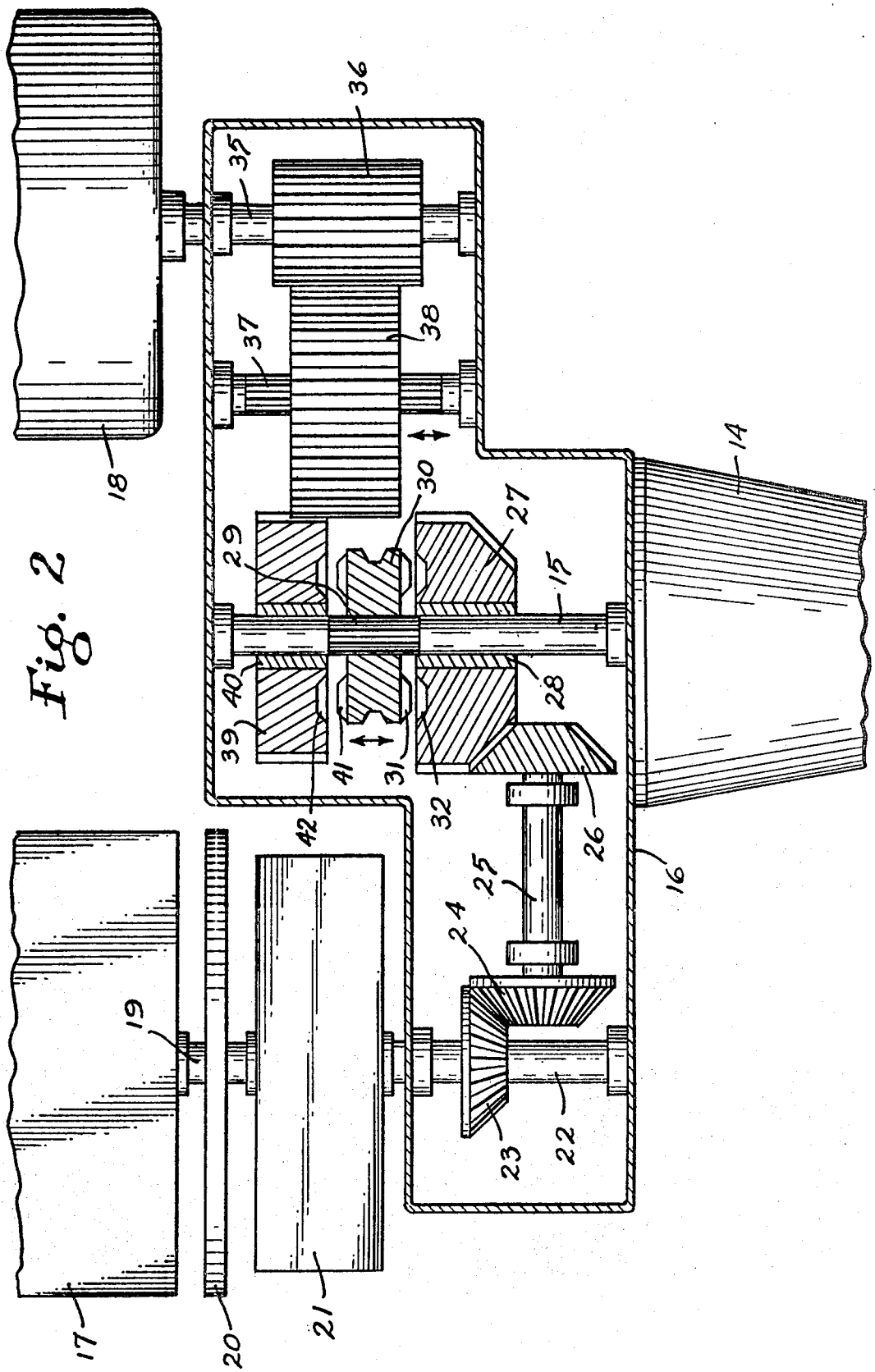

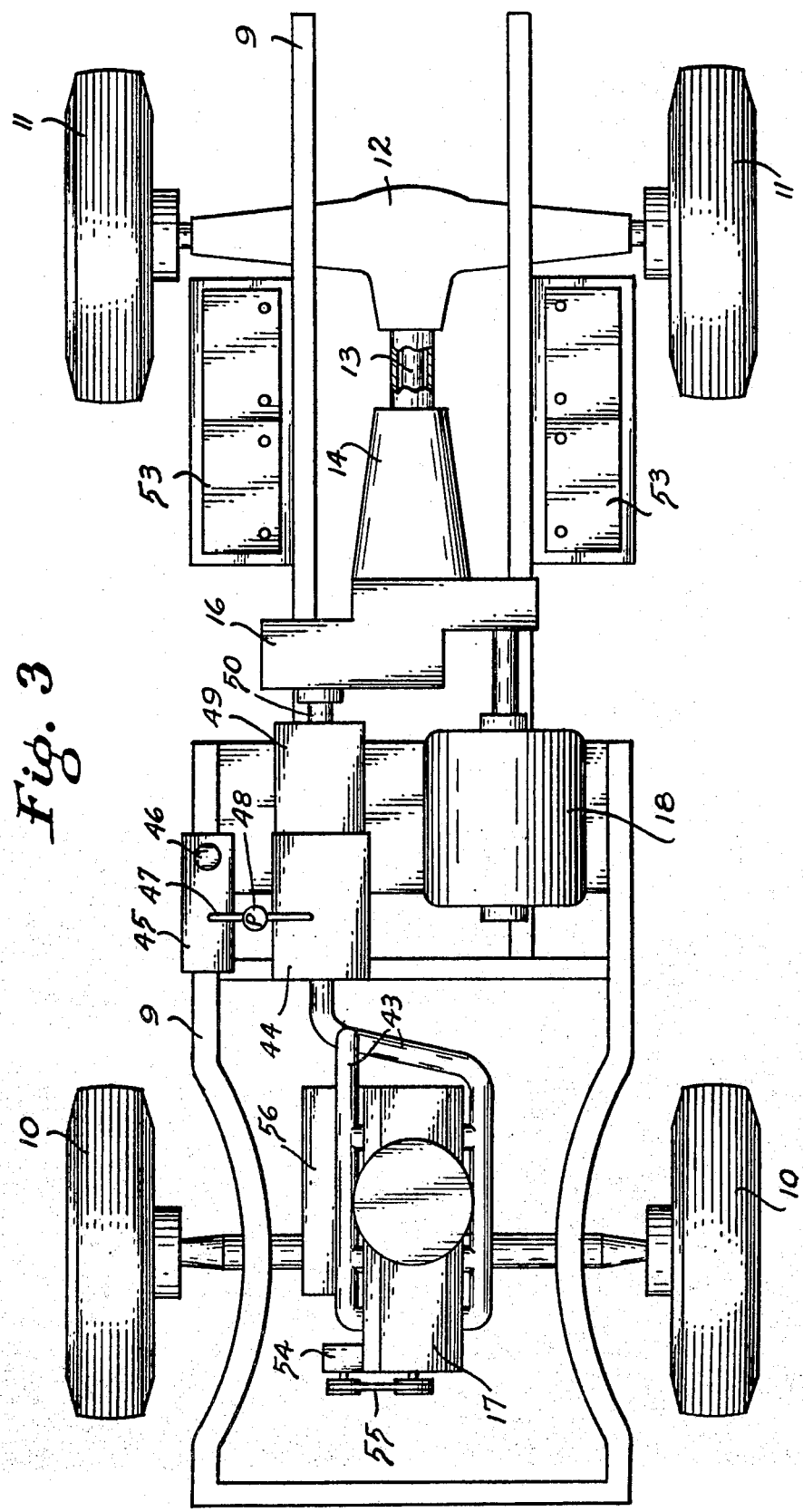

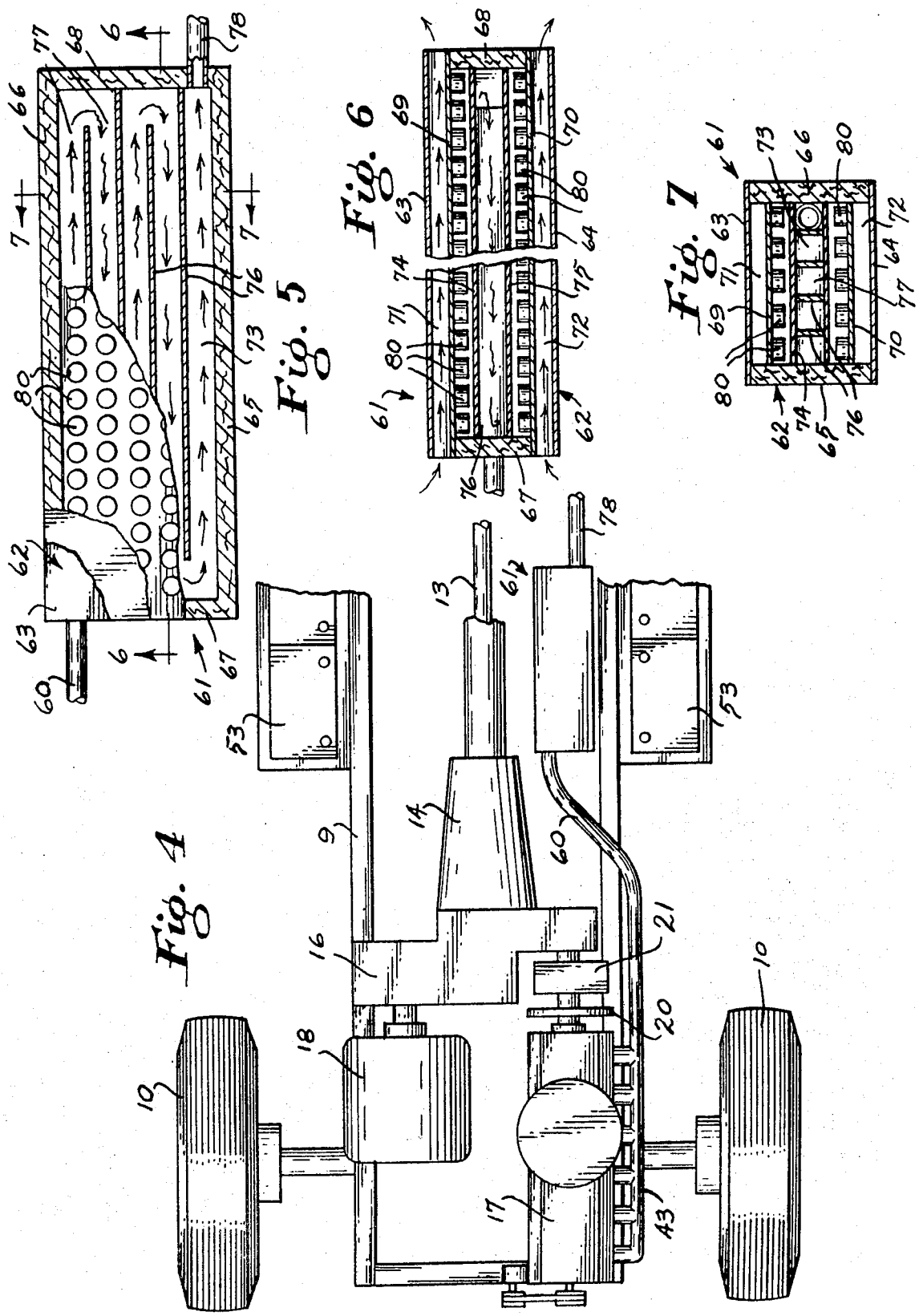

HYBRID VEHICLES

This application is a division, of application Ser. No. 322,050, filed 11/16/81, now U.S. Pat. No. 4,405,029, issued 9-20-83 which is a continuation-in-part of Ser. No. 108,987, filed Jan. 2, 1980, now abandoned.

SUMMARY OF THE INVENTION

This invention relates generally to motor vehicles and is embodied particularly in a hybrid vehicle having multiple power plants which may be driven independently or simultaneously. The vehicle includes an electric motor which may be selectively connected through a power transfer case to a drive shaft which in turn is connected to drive certain of the wheels of the vehicle for use primarily in stop and go city traffic when the speed of the vehicle seldom exceeds twenty miles per hour. The vehicle also includes an internal combustion engine which may be selectively connected to drive certain of the drive wheels of the vehicle and is used primarily for suburban and highway driving in which the speed of the vehicle exceeds approximately twenty miles per hour. When the internal combustion engine is being used to propel the vehicle and the electric motor is not in use, the waste heat from the internal combustion engine is used to generate electrical energy. In a preferred embodiment, the waste heat from the internal combustion engine is directed to a chamber into which water or other liquid is injected to form steam or a vapor and such steam or vapor is used to drive a turbine which in turn operates an electrical generating unit such as the electric motor which is arranged in a power generating mode to generate electrical energy. In another embodiment of the invention, the exhaust gases from the internal combustion engine are passed through an exhaust system which includes a series of photovoltaic devices, whereby the radiant energy from the hot exhaust gases may be utilized to generate electrical energy. In both embodiments, a plurality of batteries are provided which receive energy from the electrical generating units and store sufficient energy to drive the electric motor for several hours, depending upon the size and rating of the motor, the driving conditions, and other units of the vehicle such as lights, radio, windshield wipers and the like.

BRIEF DESCRIPTION OF THE DRAWINGS

FIG. 1 is a schematic top plan view of the chassis of an automotive vehicle illustrating one application of the invention.

FIG. 2 is an enlarged sectional view of the power transfer case.

FIG. 3 is a schematic top plan view of an automobile chassis illustrating another embodiment of the invention.

FIG. 4 is a partial schematic top plan view of the chassis of an automotive vehicle, utilizing another embodiment of the invention.

FIG. 5 is an enlarged top plan view of the invention of FIG. 4 with portions broken away for clarity.

FIG. 6 is a section taken along line 6—6 of FIG. 5.

FIG. 7 is a section taken along line 7—7 of FIG. 5.

DESCRIPTION OF THE PREFERRED EMBODIMENTS

With particular reference to FIGS. 1 and 2, an automotive vehicle has a frame or chassis 9 which is connected to ground-engaging front wheels 10 and rear wheels 11 by a conventional suspension system (not shown). In this embodiment the rear wheels 11 are the drive wheels of the vehicle and are connected to a conventional differential 12 which in turn is driven by a drive shaft 13 connected to a conventional manual or automatic transmission 14. The transmission 14 is connected to a main power shaft 15 located within a transfer case 16.

The main power shaft 15 may be driven selectively by an internal combustion engine 17, an electric motor 18, or, if desired, may be driven by both the internal combustion engine and the electric motor simultaneously. In order to do this the internal combustion engine 17 has an output shaft 19 on which a fly wheel 20 is mounted and such output shaft drives a fluid coupling or torque converter 21 of conventional construction. The fluid coupling is drivingly connected to an auxiliary power input shaft 22 which extends into the transfer case 16 and has a first bevel gear 23 fixed thereon. A second bevel gear 24 meshes with the first bevel gear 23 and such second bevel gear is mounted on one end of a shaft 25 which has a third bevel gear 26 mounted at the opposite end. The third bevel gear meshes with a combination bevel and spur power gear 27 which is freely rotatably mounted on the main power shaft 15 by a bearing or bushing 28.

In order to drive the power gear 27, the main power shaft 15 is provided with a splined section 29 on which a synchromesh assembly 30 is slidably mounted. The synchromesh assembly 30 has a plurality of teeth 31 on one side which selectively engage cooperating recessed teeth 32 in the gear 27 when the synchromesh assembly 30 is moved along the splined section 29 by a shifting fork (not shown). When the teeth 31 and 32 are in meshing engagement and the transmission 14 is in gear, power from the internal combustion engine 17 is conveyed to the transmission 14 and the drive shaft 13 to cause the rear wheels 12 to be rotated for propelling the vehicle.

In order to drive the vehicle by means of the electric motor 18, the rotor shaft of such electric motor is connected to an auxiliary power input shaft 35 which extends into the transfer case 16 and has a first spur gear 36 fixed thereon. A splined shaft 37 is rotatably mounted within the transfer case 16 in spaced parallel relationship with the auxiliary power input shaft 35 and such splined shaft slidably receives an idler gear 38 which meshes with the spur gear 36. The idler gear 38 is moved axially of the splined shaft 37 by a conventional shifting fork (not shown).

With particular reference to FIG. 2, the idler gear 38 selectively meshes with a power spur gear 39 which is freely rotatably mounted on the main power shaft 15 by a bearing or bushing 40. In order to drivingly connect the power spur gear 39 to the main power shaft 15, the synchromesh assembly 30 is provided with outwardly extending teeth 41 which selectively mesh with recessed teeth 42 in the power spur gear 39. It will be apparent that when the synchromesh assembly 30 is shifted so that the teeth 41 engage and mesh with the teeth 42 of the power spur gear 39, the teeth 31 do not mesh with the teeth 32 of the main power gear 27 and therefore the main power gear 27 is free to rotate on the power shaft 15.

In order to drive the vehicle by means of the internal combustion engine 17 and the electric motor 18 simultaneously, the synchromesh assembly 30 is shifted into engagement with the main power gear 27 and the idler gear 38 is shifted toward the rear of the vehicle so that the idler gear meshes with the spur gear 36 and the main power gear 27. The internal combustion engine and the electric motor can be operated simultaneously because the fluid coupling or torque converter acts as a torque compensator when the two power sources are operating at different speeds and torques and allow one power source to match the other.

The internal combustion engine 17 is provided with an exhaust manifold 43 which communicates with a chamber 44 in such a manner that when the internal combustion engine is operating, the waste heat and products of combustion are discharged therefrom. In a preferred embodiment of the invention, the waste heat is directed into a chamber 44. A water tank or other liquid supply tank 45 having a filler cap 46 is mounted adjacent to the chamber 44 and such liquid supply tank is connected to the chamber by a fluid line 47 in which a pump 48 is located. Preferably the pump 48 is operated automatically in response to the temperature and pressure within the chamber 44 so that when the temperature within the chamber reaches a predetermined level, liquid from the tank 45 is injected into the chamber 44 so that such liquid is converted to a vapor and in the case water is injected, to steam.

The vapor or steam is discharged from the chamber 44 into a vapor or steam driven turbine 49 and such turbine drives a shaft 50 connected to one side of an overrunning clutch 51. The opposite side of the clutch is connected to the rotor shaft of the electric motor 18 which is coupled to the auxiliary power input shaft 35. When water is used as the supply liquid, the steam which has been used to drive the turbine 49 may be discharged to the atmosphere through an exhaust pipe 52. However, it is believed that in most cases that the vapor, steam or liquid mist passing from the turbine 49 may be separated from the exhaust gases from the internal combustion engine and condensed, recirculated and returned as a liquid to the supply tank 45 via a condensation system (not shown) while the exhaust gases are discharged to the atmosphere. Collection and recirculation of the vapors passing from the turbine is necessary both from cost and environmental considerations, especially when liquids other than water, such as ammonias or alcohols or the like are used as the primary or as a portion of the liquid supply. Further, recirculation will reduce the necessity for constantly filling of replenishing the liquid supply.

During the turbine driven phase of operation, the electric motor 18 is arranged in a power generating mode so that the turbine drives the electric motor and causes the motor to generate electrical energy which is stored in one or more banks of batteries 53. The energy from the batteries is used to drive the electric motor when the motor is connected to drive the vehicle and may be used to power other equipment of the vehicle which require electricity, such as head lights, tail lights, turn signals, windshield wipers, radios and other accessories.

The internal combustion engine 17 includes an alternator 54 which is driven by a belt 55 from the crankshaft of the internal combustion engine and the alternator additionally generates electrical energy which is stored within the batteries 53. When the internal combustion engine 17 and the electric motor 18 are connected through the transfer case 16 to the drive shaft so that they are simultaneously providing drive power to the vehicle, the electric motor is disconnected from the turbine by the overrunning clutch 51 so that the electric motor no longer generates electrical energy; however, the alternator 54 continues to supply energy to the batteries as the electric motor uses energy therefrom. Normally the electric motor is used for stop and go urban driving in which speeds seldom exceed approximately twenty miles per hour and the internal combustion engine 17 normally is used for suburban and highway driving in which the speeds are normally above twenty miles per hour.

It is contemplated that the vehicle could be provided with an automatic changeover device which automatically shifts from the electrical power source to the internal combustion power source, depending upon the speed of the vehicle. Also, it is contemplated that in certain speed ranges, such as from fifteen to thirty miles per hour, both power sources may be energized to propel the vehicle. Additionally, both power sources could be utilized under heavy load conditions. It is further contemplated that the transmission 14 of the vehicle could be moved to a neutral position so that the power shaft 15 does not rotate the drive shaft 13 and the idler gear 38 may be shifted so that it engages the main power gear 27 in which case the internal combustion engine 17 drives the electric motor 18 when the motor is in the generating mode in which case the electric motor may be used for driving exterior electrical equipment such as resistance welders and the like.

With particular reference to FIGS. 4–7 of the drawings, another embodiment of the invention is disclosed wherein the radiant energy of the waste heat and exhaust gases passing from the discharge manifold 43 of the internal combustion engine 17 is converted directly to electrical energy. In this embodiment, an exhaust pipe 60 is connected to the discharge manifold 43 and extends rearwardly toward the back of the vehicle chassis 9 and communicates with an exhaust chamber 61.

The exhaust chamber 61 includes a housing 62 having upper and lower walls 63 and 64, side walls 65 and 66 and front and end panels 67 and 68. The upper and lower walls 63 and 64 are spaced from adjacent interior wall plates 69 and 70, respectively, and therebetween create upper and lower air flow or cooling channels or passageways 71 and 72. The central portion of the housing 62 includes a baffle chamber 73 having upper and lower generally parallel heat exchanging surfaces 74 and 75 which are connected by a plurality of vertically disposed baffle plates 76. With particular reference to FIG. 5 of the drawings, the baffle plates create a number of generally parallel flow channels 77 therebetween so that the exhaust gases follow a serpentined flow path through the exhaust chamber between the exhaust pipe 60 and an exhaust discharge pipe 78.

In order to utilize the radiant energy being dissipated by the exhaust gases as such gases pass through the exhaust chamber, a series of photovoltaic cells 80 are mounted adjacent the head exchange surfaces 74 an 75 of the central portion of the housing 62. With particular reference to FIGS. 5 and 7, it should be noted that the photovoltaic cells 80 are arranged in generally parallel rows so as to be symmetrically oriented with respect to the exhaust flow channels 77. The photovoltaic cells convert the energy radiated from the exhaust gases into electricity and are electrically connected to the storage batteries 53 and thereby supply a continuous charge of electrical current thereto when the internal combustion engine is in operation. It should be noted that during operation of the internal combustion engine the air flow cooling channels 71 and 72 will permit ambient air to dissipate heat adjacent the photovoltaic cells 80.

In use of this embodiment of the invention, a constant supply of electrical current is provided for charging the electricity storage batteries 53 or for operating or supplementing the vehicle electrical power source for generating current for head lights, tail lights, turn signals, radio and other accessory equipment and motors. The electrical energy stored in the batteries 53 may subsequently be used to power the electric motor 18 which motor may be used with the single motive source for the vehicle or may be used simultaneously with the internal combustion engine as previously described with regard to the turbine assist embodiment of this invention.

With particular reference to FIG. 3, the internal combustion engine 17 is mounted adjacent the forward portion of the frame 9 and such internal combustion engine drives a transmission 56 which in turn drives the front wheels 10 so that the vehicle essentially is a front wheel drive. The exhaust manifold 43 of the engine 17 may be connected to either of the electrical generating systems disclosed for converting waste heat or radiant energy to electrical energy. In FIG. 3, the exhaust manifold 43 is connected to the chamber 44 for generating vapor or steam in the same manner as previously described.

Additionally, the electric motor 18 is connected to the auxiliary power input shaft 22 of the transfer case so that the electric motor can be utilized to drive the main power shaft 15, drive shaft 13 and the rear wheels 11 so that the vehicle essentially is a rear wheel drive vehicle as long as the internal combustion engine 17 is not operating. Of course, if both the internal combustion engine and the electric motor are being operated simultaneously, the vehicle becomes a four-wheel drive vehicle as long as the speed of the front wheels is synchronized with the speed of the rear wheels. The turbine 49 is connected to the auxiliary power input shaft 35 of the transfer case 16 to drive the spur gear 36 and idler gear 38. When the electric motor is operating, the idler gear 38 meshes with the power spur gear 39; however, the gear 39 does not engage the synchromesh assembly 30 and therefore such power spur gear is free to rotate. When the electric motor is not operating, the idler gear 38 is shifted to mesh with the power gear 27 and simultaneously the synchromesh assembly is shifted out of engagement with the power gear 27 so that such power gear is freely rotatably mounted on the power shaft 15 and drives the electric motor through the gears in the transfer case so that the electric motor functions as a generator.

I claim:

1. A hybrid vehicle comprising a frame supported by ground engaging wheels, propelling means including a transmission and drive shaft for driving certain of said wheels, an electric motor mounted on said frame, means for selectively connecting said electric motor to said propelling means, said means for connecting said electric motor to said propelling means for the vehicle including a transfer case having a power shaft connected to said transmission, an internal combustion engine mounted on said frame, means for selectively connecting said internal combustion engine to said power shaft to selectively drive said propelling means, said transfer case further including bypass means operably connecting said internal combustion engine to drive said electric motor to generate electricity while simultaneously disconnecting said internal combustion engine and said electric motor from said propelling means, said internal combustion engine having an exhaust manifold for removing heated exhaust gases therefrom, chamber means communicating with said exhaust manifold for receiving said exhaust gases therefrom, at least one means for converting radiant energy into electrical energy mounted within said chamber means for utilizing the energy of said heated exhaust gases within said chamber means to generate electrical current, means for electrically connecting said means for converting radiant energy into electrical energy to at least one storage battery for receiving and storing electrical energy, said chamber means including a housing having an exhaust gas inlet and outlet, at least one baffle disposed within said housing and between said inlet and outlet to create flow channels for diverting the exhaust gases flowing through said housing, and said means for converting radiant energy into electrical energy being mounted adjacent to one of said channels, said storage battery being electrically connected to said electric motor to drive said electric motor when said electric motor is connected to said propelling means, whereby either said internal combustion engine or said electric motor may be selectively operated to propel the vehicle and wherein the storage battery may be charged during operation of the internal combustion engine through the use of radiant energy from the exhaust gases.

2. The invention of claim 1 in which said housing includes ambient air passages in heat exchange relationship with said means for converting radiant energy into electrical energy.

3. The invention of claim 2 including a plurality of generally parallel spaced baffles within said housing creating a plurality of flow channels arranged in a serpentine flow path for said exhaust gases, and a plurality of means for converting radiant energy into electrical energy mounted adjacent to and along opposite sides of said channels.

* * * * *